US012677977B2

(12) United States Patent
Jinno et al.

(10) Patent No.: US 12,677,977 B2
(45) Date of Patent: Jul. 14, 2026

(54) NOODLE BOILING APPARATUS

(71) Applicant: Sodick Co., Ltd., Kanagawa (JP)

(72) Inventors: Hisahiko Jinno, Kanagawa (JP);
Masato Taniguchi, Kanagawa (JP);
Kazutake Muramoto, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 1251 days.

(21) Appl. No.: 17/547,257

(22) Filed: Dec. 10, 2021

(65) Prior Publication Data

US 2022/0233013 A1     Jul. 28, 2022

(30) Foreign Application Priority Data

Jan. 25, 2021     (JP) ................................. 2021-009513

(51) Int. Cl.
| | |
|---|---|
| *A47J 27/21* | (2006.01) |
| *A23L 5/10* | (2016.01) |
| *A47J 27/00* | (2006.01) |
| *A47J 27/18* | (2006.01) |
| *B08B 9/032* | (2006.01) |

(52) U.S. Cl.
CPC ........... *A47J 27/21166* (2013.01); *A23L 5/13* (2016.08); *A47J 27/18* (2013.01); *B08B 9/0321* (2013.01); *A47J 2027/006* (2013.01); *B08B 2209/032* (2013.01)

(58) Field of Classification Search
None
See application file for complete search history.

(56) References Cited

U.S. PATENT DOCUMENTS

| | | | |
|---|---|---|---|
| 4,512,559 A | 4/1985 | Aoyama et al. | |
| 4,543,878 A * | 10/1985 | Luchetti | ................. G07F 9/105 |
| | | | 426/507 |

(Continued)

FOREIGN PATENT DOCUMENTS

| | | | |
|---|---|---|---|
| CN | 106901593 | 6/2017 | |
| CN | 110608462 A | * 12/2019 | |

(Continued)

OTHER PUBLICATIONS

CN 110608462 A (Li, Xiao-jun et al.) Dec. 24, 2019 [retrieved on Apr. 18, 2025]. Retrieved from Foreign Image and Text database, translation by Clarivate Analytics. (Year: 2019).*

(Continued)

*Primary Examiner* — John J Norton
(74) *Attorney, Agent, or Firm* — JCIPRNET

(57)     ABSTRACT

A noodle boiling apparatus includes a noodle boiling unit, and a hot water supply mechanism supplying water, which is heated, to the noodle boiling unit. The noodle boiling unit includes a boiling tank storing the water and boiling noodles, a hot water pipe supplying the water, which is heated, to the boiling tank, and a discharge pipe discharging the water from the boiling tank to the hot water supply mechanism. The hot water supply mechanism includes a heat exchanger heating the water to a desired temperature and a circulation pump pumping the water to the heat exchanger. The hot water supply mechanism is configured to circulate the water constantly between the boiling tank and the hot water supply mechanism when the noodles are boiled.

7 Claims, 9 Drawing Sheets

(56)  References Cited

U.S. PATENT DOCUMENTS

| | | | | | |
|---|---|---|---|---|---|
| 4,821,632 | A | * | 4/1989 | Bolzani | A47J 27/18 99/413 |
| 5,142,966 | A | * | 9/1992 | Morandi | A47J 27/18 99/330 |
| 5,361,682 | A | * | 11/1994 | Crolla | A47J 27/18 426/523 |
| 2004/0177766 | A1 | * | 9/2004 | Contessini | A47J 27/14 99/330 |
| 2009/0090247 | A1 | * | 4/2009 | Saltini | A47J 27/18 99/352 |

FOREIGN PATENT DOCUMENTS

| | | | | |
|---|---|---|---|---|
| JP | | S579339 | | 2/1982 |
| JP | | S6232485 | | 8/1987 |
| JP | | H06225839 | | 8/1994 |
| JP | H08164068 | A | * | 6/1996 |
| JP | | 2003325118 | | 11/2003 |
| JP | | 2013244121 | | 12/2013 |
| JP | | 6433104 | | 12/2018 |
| KR | | 200370859 | | 12/2004 |
| KR | 101459627 | B1 | * | 11/2014 .............. F24C 13/00 |
| WO | WO-03103863 | A1 | * | 12/2003 .............. B08B 9/00 |
| WO | | 2005115205 | | 12/2005 |

OTHER PUBLICATIONS

KR 10-1459627 B1 (Ji, Kyung-ha et al.) Nov. 7, 2014 [retrieved on Apr. 18, 2025]. Retrieved from Foreign Image and Text database, translation by Clarivate Analytics. (Year: 2014).*

JP 2003-325118 A (Hoshida, Shinichi) Nov. 18, 2003 [retrieved on Apr. 18, 2025]. Retrieved from Foreign Image and Text database, translation by Clarivate Analytics. (Year: 2003).*

JP H08-164068 A (Otake, Nobuo) Jun. 25, 1996 [retrieved on Jan. 24, 2026]. Retrieved from Foreign Image and Text database, translation by Clarivate Analytics. (Year: 1996).*

"Office Action of Japan Counterpart Application", issued on Oct. 7, 2021, with English translation thereof, p. 1-p. 8.

* cited by examiner

NOODLE BOILING APPARATUS

CROSS-REFERENCE TO RELATED APPLICATION

This application claims the priority benefit of Japan application serial No. 2021-009513, filed on Jan. 25, 2021. The entirety of the above-mentioned patent application is hereby incorporated by reference herein and made a part of this specification.

BACKGROUND

Technical Field

The disclosure relates to a noodle boiling apparatus.

Related Art

A noodle boiling apparatus is provided with a boiling tank storing water heated to a predetermined temperature, and boils noodles put into the boiling tank. Various methods have been known for heating the water in the boiling tank. In a noodle boiling apparatus disclosed in Japanese Utility Model Patent Publication No. S62-032485, water in the boiling tank is heated by a gas burner installed below the boiling tank. In a noodle boiling apparatus disclosed in Japanese Patent Publication No. S57-009339, water in the boiling tank is heated by an electric heater provided in the boiling tank. In a noodle boiling apparatus disclosed in Japanese Patent Publication No. 6433104, vapor is supplied to the water in the boiling tank for heating.

In the conventional apparatus, water at room temperature is stored in the boiling tank, and then the water is heated. Therefore, it takes a relatively long time to start up the apparatus as it has to go through two steps, i.e., water supply and heating. In addition, the loss in heating is relatively large, and energy loss occurs.

Further, when noodles are boiled, precipitate such as starch dissolved from the noodles accumulates in the boiling tank. If this precipitate accumulates for a long time, it sticks to the bottom surface and the wall surface of the boiling tank, which may affect the quality of noodles and increase the labor for cleaning. To prevent the accumulation of precipitate, it is conceivable to increase the amount of water supplied to the boiling tank to increase the amount of water circulation, but there is a limit to the increase in the water supply amount as it causes a drop in the water temperature.

SUMMARY

An embodiment of the disclosure provides a noodle boiling apparatus including a noodle boiling unit, and a hot water supply mechanism supplying water, which is heated, to the noodle boiling unit. The noodle boiling unit includes a boiling tank storing the water and boiling noodles, a hot water pipe supplying the water, which is heated, to the boiling tank, and a discharge pipe discharging the water from the boiling tank to the hot water supply mechanism. The hot water supply mechanism includes a heat exchanger and a circulation pump. The heat exchanger includes a first passage having a first inlet to which vapor is supplied and a first outlet from which the vapor is discharged, and a second passage having a second inlet to which the water is supplied and a second outlet from which the water is discharged. The first inlet is connected to a vapor supplier which supplies the vapor, the second inlet is connected to the discharge pipe and a clean water supplier which supplies clean water, the second outlet is connected to the hot water pipe, and the water flowing in the second passage undergoes heat exchange by the vapor flowing in the first passage to be heated to a desired temperature. The circulation pump is provided between the second inlet and the discharge pipe and pumps the water to the second inlet. The hot water supply mechanism is configured to circulate the water constantly between the boiling tank and the hot water supply mechanism when the noodles are boiled.

In the noodle boiling apparatus according to an embodiment of the disclosure, water heated in advance by the heat exchanger is supplied to the boiling tank. Since the water supply to the boiling tank and the heating of the water are performed in parallel, start-up of the apparatus can be performed in a shorter time and with energy efficiency. In addition, when the noodles are being boiled, water can also be supplied to the boiling tank while avoiding causing a water temperature drop of the boiling tank as much as possible. Therefore, when the noodles are being boiling, water can be constantly circulated between the boiling tank and the hot water supply mechanism. As a result, it is possible to prevent precipitate from sticking to the boiling tank.

DESCRIPTION OF THE EMBODIMENTS

The disclosure provides a noodle boiling apparatus with which start-up of the apparatus can be performed efficiently in a shorter time, and precipitate is less likely to stick to the boiling tank.

Hereinafter, an embodiment of the disclosure will be described with reference to the drawings. Various modification examples described below may be implemented in any combination.

A noodle boiling apparatus of this embodiment includes a noodle boiling unit 1A which boils noodles, a hot water supply mechanism 1B which supplies heated water to the noodle boiling unit 1A, and a controller (not shown) which controls the noodle boiling unit 1A and the hot water supply mechanism 1B. The noodles in this specification generally refer to foods formed by kneading edible flour with water or the like, and include udon noodles, buckwheat noodles, somen noodles, hiyamugi, Chinese noodles, pasta, rice noodles, and cellophane noodles. In other words, the noodles in this specification include noodles using non-wheat edible flour as the main raw material. Further, in this specification, water heated to a predetermined temperature by the hot water supply mechanism 1B is particularly referred to as hot water, and clean water before heating, more specifically, tap water at room temperature, is referred to as clean water. Further, in this specification, water vapor is simply referred to as vapor.

Figure 1:
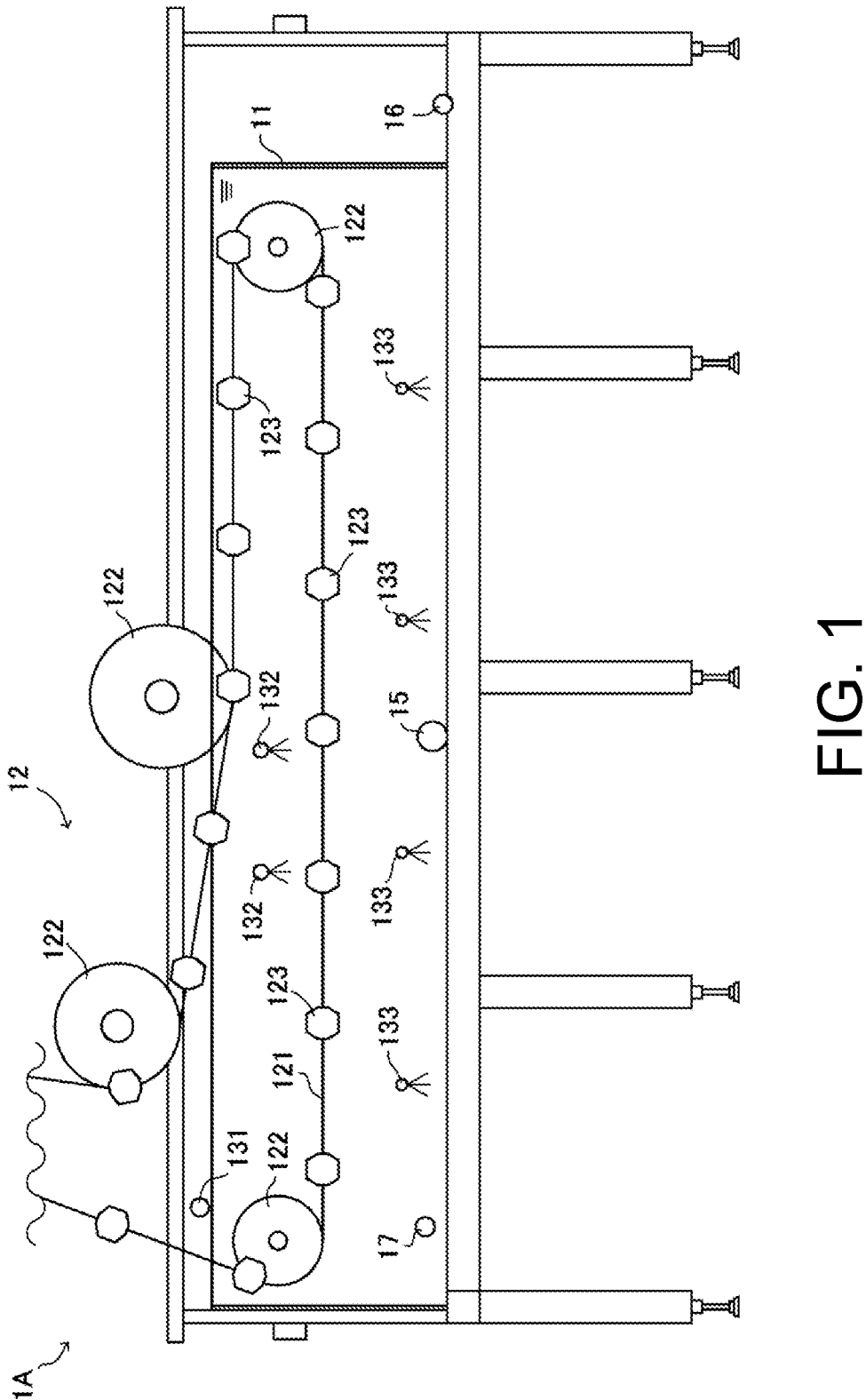
FIG. 1 is a schematic configuration view of a noodle boiling unit.
Figure 2:
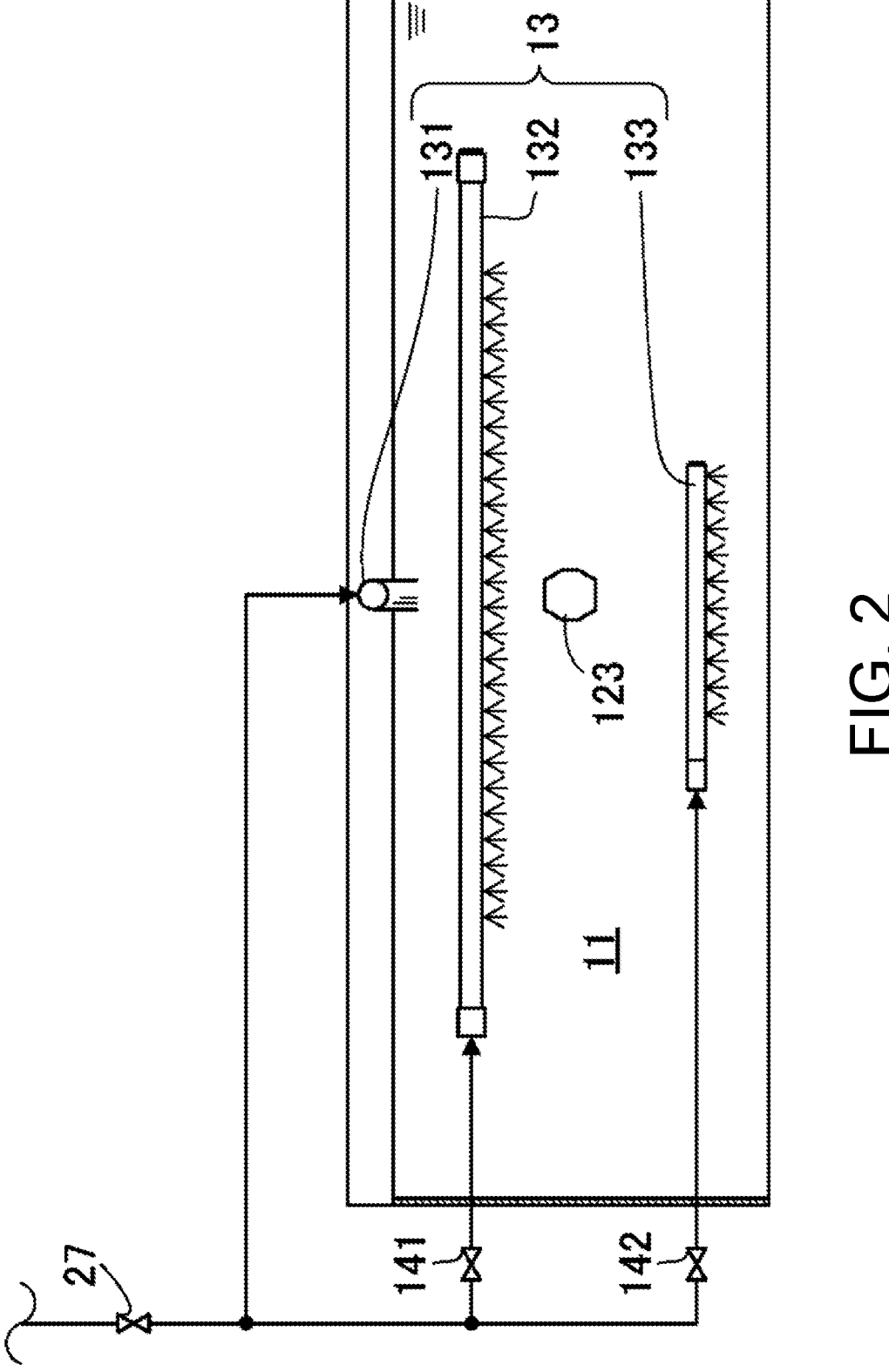
FIG. 2 is a cross-sectional view of the periphery of a boiling tank.
Figure 3:
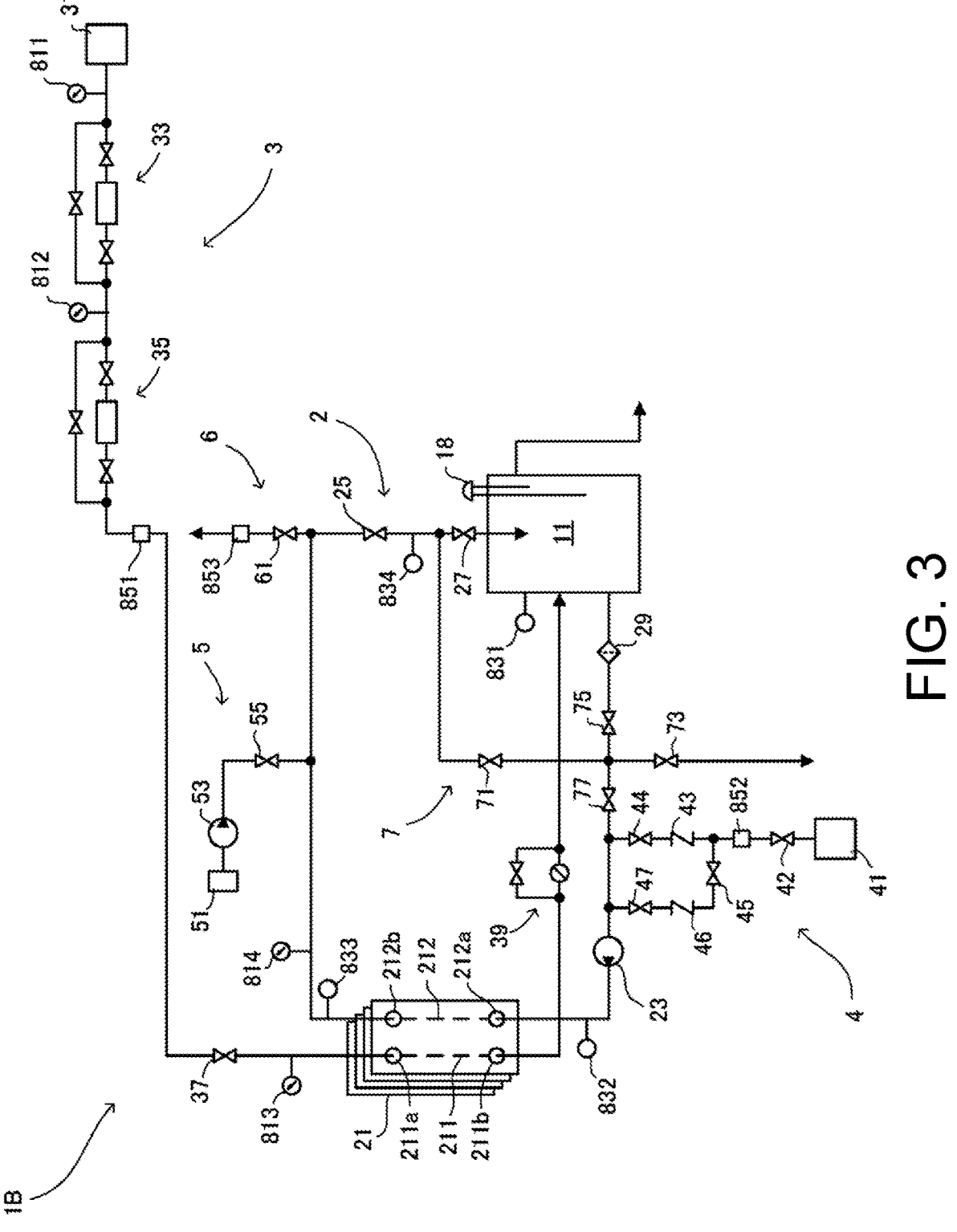
FIG. 3 is a circuit diagram of a hot water supply mechanism.

As shown in FIG. 1 to FIG. 3, the noodle boiling unit 1A of this embodiment includes a boiling tank 11, a transfer device 12, a hot water pipe 13, a discharge pipe 15, an overflow port 16, a drain supply pipe 17, and a water level gauge 18.

Hot water is stored in the boiling tank 11, and noodles put into the hot water are boiled. The noodle boiling unit 1A of this embodiment is of a so-called continuous type, and a predetermined amount of noodles is transferred by the transfer device 12 and passes through the hot water of the boiling tank 11. Specifically, the transfer device 12 has a chain 121, sprockets 122, buckets 123, and a supply/discharge device (not shown), and noodles contained in the bucket 123 are guided inside the boiling tank 11 by the chain 121 and the sprockets 122, and then discharged from the bucket 123. The noodle boiling unit 1A may also be of a so-called batch type which boils a large amount of noodles at one time.

The hot water pipe 13 is one or more pipes that supply hot water to the boiling tank 11. In this embodiment, the hot water pipe includes a main hot water pipe 131, a loosening jet pipe 132, and a tank bottom jet pipe 133. The main hot water pipe 131 has an opening provided at an upper part or above the boiling tank 11 and serves as a main supply port of hot water supplied from the hot water supply mechanism 1B. The loosening jet pipe 132 and the tank bottom jet pipe 133 are configured to be capable of jetting hot water supplied from the hot water supply mechanism 1B as jets, and are, for example, pipes on which holes are formed at a predetermined interval. Shower nozzles may also be provided at the holes of the pipes as necessary. The loosening jet pipe 132 ejects jets to noodles of the boiling tank 11 to loosen the noodles. In the noodle boiling unit 1A of the continuous type, the loosening jet pipe 132 is provided in the boiling tank 11 so that the jets hit the transfer passage of the noodles. The tank bottom jet pipe 133 is provided at a lower part of the boiling tank 11 and ejects jets toward the bottom surface of the boiling tank 11. Accordingly, it is possible to prevent precipitate generated during boiling noodles from accumulating and sticking to the bottom surface of the boiling tank 11.

On-off valves 141 and 142 are respectively provided on the inlet sides of the loosening jet pipe 132 and the tank bottom jet pipe 133. If necessary, hot water may be supplied to the boiling tank 11 using all of the main hot water pipe 131, the loosening jet pipe 132, and the tank bottom jet pipe 133, or hot water may be supplied to the boiling tank 11 only from the main hot water pipe 131.

The discharge pipe 15 has an opening provided at the lower part of the boiling tank 11, and discharges hot water from the boiling tank 11 to the hot water supply mechanism 1B. The hot water discharged from the discharge pipe 15 is reheated by the hot water supply mechanism 1B and returned to the boiling tank 11 again.

The boiling tank 11 is configured to maintain a predetermined water level, and hot water exceeding the predetermined water level and overflowing from the boiling tank 11 is discharged from the overflow port 16 to the outside of the apparatus. During boiling noodles, the supply amount of hot water to the boiling tank 11 may be greater than the discharge amount and the evaporation amount of hot water from the boiling tank 11. In other words, noodle boiling may be performed while constantly discharging hot water in the boiling tank 11 little by little to the outside of the apparatus via the overflow port 16. Accordingly, precipitate in the boiling tank 11 can be discharged to the outside of the apparatus, and salt concentration and the like of the hot water can be kept uniform.

The drain supply pipe 17 has an opening provided inside the boiling tank 11 and supplies into the boiling tank 11 the drain generated from condensation of vapor in the hot water supply mechanism 1B. By reusing the drain generated in the hot water supply mechanism 1B, hot water can be circulated without wasting the heat energy of the drain.

The water level gauge 18 detects the water level of hot water in the boiling tank 11. In this embodiment, the water level gauge 18 is configured to be capable of detecting the water level at which the circulation of hot water is started and the water level when the boiling tank 11 is full.

The hot water supply mechanism 1B is configured to circulate water constantly between the boiling tank 11 and the hot water supply mechanism 1B when the noodles are boiled. As shown in FIG. 3, the hot water supply mechanism 1B of this embodiment includes a circulation passage 2 which circulates water between the boiling tank 11 and a heat exchanger 21, a vapor passage 3 which supplies vapor to the heat exchanger 21, a water supply passage 4 which supplies clean water to the heat exchanger 21, a cleaning liquid pump unit 5 which supplies a cleaning liquid to the circulation passage 2, a degassing passage 6 for performing degassing from the circulation passage 2, and a drainage passage 7 which drains water to the outside of the apparatus.

The circulation passage 2 includes a heat exchanger 21, a circulation pump 23, a flow rate adjustment valve 25, an on-off valve 27, a filter 29, and pipes connecting each part. The discharge pipe 15 and the hot water pipe 13 are connected by the circulation passage 2 having the heat exchanger 21. Water and vapor are supplied to the heat exchanger 21, and the water heated by heat exchange with the vapor is discharged from the heat exchanger 21 and sent to the boiling tank 11 via the hot water pipe 13. The circulation pump 23 is provided upstream of the heat exchanger 21, and pumps the water supplied from the water supply passage 4 and the water discharged from the boiling tank 11 to the heat exchanger 21. The flow rate adjustment valve 25 controls the flow rate of water circulating in the circulation passage 2. The on-off valve 27 is provided upstream of the hot water pipe 13 and is opened when hot water is supplied to the boiling tank 11. The filter 29 removes impurities such as noodle scraps contained in the water discharged from the discharge pipe 15.

Figure 4:
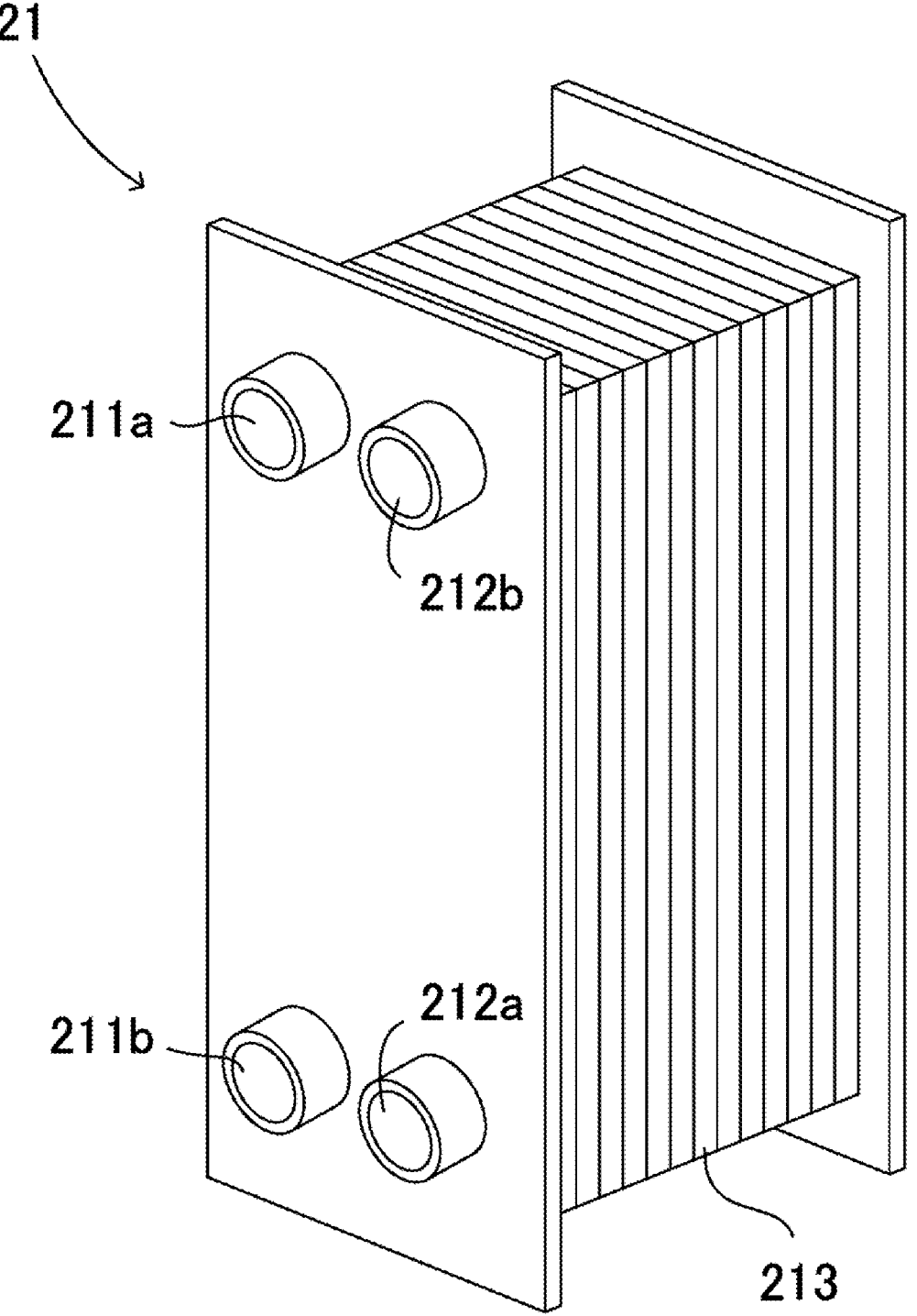
FIG. 4 is a schematic configuration view of a heat exchanger.

The heat exchanger 21 of this embodiment is specifically a plate-type heat exchanger, but other types such as a multi-pipe heat exchanger and a spiral heat exchanger may also be adopted. As shown in FIG. 3 and FIG. 4, the heat exchanger 21 of this embodiment is configured by overlapping a plurality of heat transfer plates 213, and includes a first passage 211 partitioned by the heat transfer plates 213 and through which vapor flows, and a second passage 212 partitioned by the heat transfer plates 213 and through which water flows. The first passage 211 has a first inlet 211a to which vapor is supplied and a first outlet 211b from which vapor is discharged. The second passage 212 has a second inlet 212a to which water is supplied and a second outlet 212b from which water is discharged. The second inlet 212a is connected to a clean water supplier 41 via the water supply passage 4 and is connected to the discharge pipe 15. The circulation pump 23 is provided between the second inlet 212a and the discharge pipe 15 and pumps water to the second inlet 212a. The second outlet 212b is connected to the hot water pipe 13. With such a configuration, the water flowing through the second passage 212 undergoes heat exchange by the vapor flowing through the first passage 211 and is heated to a desired temperature. The temperature of hot water generated by the heat exchanger 21 is, for example, about 99° C.

The vapor passage 3 includes a first pressure reducing valve 33, a second pressure reducing valve 35, a proportioning valve 37, a steam trap 39, and pipes connecting each part. The vapor passage 3 is supplied with vapor from a vapor supplier 31. The vapor supplier 31 is, for example, a boiler, which is a device capable of supplying water vapor at a predetermined temperature and pressure. The vapor supplier 31 is connected to the first inlet 211a of the heat exchanger 21 via the first pressure reducing valve 33, the second pressure reducing valve 35, and the proportioning valve 37. The amount of vapor supplied to the heat exchanger 21, and thus the temperature of hot water discharged from the heat exchanger 21, may be controlled by the first pressure reducing valve 33, the second pressure reducing valve 35, and the proportioning valve 37. For example, it is possible that temperature control is basically performed by the proportioning valve 37, and the first pressure reducing valve 33 and the second pressure reducing valve 35 are used only when the control is difficult solely by the proportioning valve 37. The steam trap 39 is connected to the first outlet 211b of the heat exchanger 21. The steam trap 39 prevents vapor from leaking from the vapor passage 3 and discharges drain generated from the vapor to prevent problems such as a water hammer phenomenon. The drain discharged from the steam trap 39 is sent to the boiling tank 11 via the drain supply pipe 17.

The water supply passage 4 is connected to the upstream side of the heat exchanger 21 of the circulation passage 2 and supplies clean water to the circulation passage 2. The water supply passage 4 is supplied with clean water from the clean water supplier 41. The clean water supplier 41 is, for example, a tap water supply. The water supply passage 4 of this embodiment is configured to be capable of switching the flow rate in two stages as necessary, and includes a first water supply passage and a second water supply passage that may supply clean water of different flow rates to the circulation passage 2. The first water supply passage includes a flow rate adjustment valve 42, a check valve 43, and an on-off valve 44. The second water supply passage branches from the middle of the first water supply passage and includes a flow rate adjustment valve 45, a check valve 46, and an on-off valve 47. The first water supply passage has a larger suppliable flow rate than the second water supply passage. When it is desired to supply a relatively large amount of clean water, e.g., at the time of start-up or cleaning of the apparatus, the on-off valve 47 is closed and the on-off valve 44 is opened to supply clean water using the first water supply passage. The water supplied from the clean water supplier 41 is adjusted to a predetermined flow rate by the flow rate adjustment valve 42 and then sent to the circulation passage 2. When it is desired to supply a relatively small amount of clean water, e.g., during boiling noodles, the on-off valve 44 is closed and the on-off valve 47 is opened to supply clean water using the second water supply passage. The water supplied from the clean water supplier 41 is adjusted to a predetermined flow rate by the flow rate adjustment valve 42 and the flow rate adjustment valve 45 and then sent to the circulation passage 2.

By adding water through the water supply passage 4, hot water can be circulated while discharging hot water from the overflow port 16, and noodle boiling can be performed while keeping the inside of the boiling tank 11 clean. Further, since the water pressure from the clean water supplier 41 is applied in addition to the pressure by the circulation pump 23 to the water circulating in the circulation passage 2, hot water can be circulated at a higher speed. Furthermore, although the water discharged from the discharge pipe 15 contains precipitate, since it is diluted with clean water supplied from the water supply passage 4 and then sent to the heat exchanger 21, adhesion of the precipitate to the heat exchanger 21 can be suppressed. Specifically, the water supply passage 4 may be connected to the upstream side of the circulation pump 23. In other words, the clean water supplied from the clean water supplier 41 may be supplied to the pipe connecting the circulation pump 23 and the discharge pipe 15. According to such a configuration, since the temperature of water on the suction side of the circulation pump 23 can be lowered and the pressure of water on the suction side can be increased, cavitation can be prevented.

The cleaning liquid pump unit 5 is connected to any position of the circulation passage 2 and is configured to be capable of supplying a cleaning agent to the circulation passage 2. The cleaning liquid pump unit 5 includes a cleaning liquid tank 51, a cleaning liquid pump 53, and an on-off valve 55. At the time of cleaning the circulation passage 2, the on-off valve 55 is opened, and the cleaning liquid stored in the cleaning liquid tank 51 is pumped by the cleaning liquid pump 53 to the circulation passage 2.

The degassing passage 6 is connected to the downstream side of the heat exchanger 21 of the circulation passage 2 and discharges air and water vapor contained in water. The degassing passage 6 includes an on-off valve 61 and a pipe. The end of the pipe of the degassing passage 6 is opened upward, and the opening is provided at the highest position that water flows in the hot water supply mechanism 1B. The air and water vapor that pass through the degassing passage 6 are discharged to the outside of the apparatus via the opening of the pipe. The degassing passage 6 is used only in a pipe cleaning process to be described later, and is not used in other processes in which degassing from the boiling tank 11 is possible.

The drainage passage 7 drains water out of the apparatus with a desired passage. In this embodiment, the drainage passage 7 includes a pipe that has one end connected between the second outlet 212b and the on-off valve 27 and the other end communicating with the outside of the apparatus, and this pipe is connected to a pipe between the discharge pipe 15 and the second inlet 212a. On-off valves 71, 73, 75, and 77 are respectively provided on four sides of a connection point of the pipes. Specifically, the on-off valve 71 is provided between the second outlet 212b and the on-off valve 27, the on-off valve 73 is provided on the outside of the apparatus, the on-off valve 75 is provided on the discharge pipe 15 side, and the on-off valve 77 is provided on the second inlet 212a side.

The noodle boiling apparatus is provided with pressure gauges, thermometers, and flow meters at appropriate positions. The pressure gauges, the thermometers, and the flow meters each display detected parameters to the operator. It is possible that at least a part of the pressure gauges, the thermometers, and the flow meters may output a signal indicating the detected parameter to the controller as necessary. In this embodiment, as the pressure gauges, a pressure gauge 811 is provided between the vapor supplier 31 and the first pressure reducing valve 33 of the vapor passage 3, a pressure gauge 812 is provided between the first pressure reducing valve 33 and the second pressure reducing valve 35 of the vapor passage 3, a pressure gauge 813 is provided between the proportioning valve 37 and the first inlet 211a of the vapor passage 3, and a pressure gauge 814 is provided between the second outlet 212b and the hot water pipe 13 of the circulation passage 2. As the thermometers, a thermometer 831 is provided in the boiling tank 11, a thermometer 832 is provided near the second inlet 212a of the circulation passage 2, a thermometer 833 is provided near the second outlet 212b of the circulation passage 2, and a thermometer 834 is provided near the boiling tank 11 of the circulation passage 2. As the flow meters, a flow meter 851 is provided between the second pressure reducing valve 35 and the proportioning valve 37 of the vapor passage 3, a flow meter 852 is provided between the clean water supplier 41 and a branch point of the first water supply passage and the second water supply passage of the water supply passage 4, and a flow meter 853 is provided in the degassing passage 6. In this embodiment, the thermometer 831 is connected to the controller, and the controller performs temperature control by operating the proportioning valve 37, the first pressure reducing valve 33, and the second pressure reducing valve 35 based on the hot water temperature in the boiling tank 11 detected by the thermometer 831. Further, in this embodiment, the flow meter 853 is connected to the controller, and the controller performs control associated with the pipe cleaning process to be described later based on the flow rate detected by the flow meter 853.

The controller operates the noodle boiling apparatus to perform various control. Specifically, based on the operation by the operator and the signals from the water level gauge 18 and the thermometer 831, the controller controls the transfer device 12, the on-off valve 141, the on-off valve 142, the circulation pump 23, the on-off valve 27, the first pressure reducing valve 33, the second pressure reducing valve 35, the proportioning valve 37, the on-off valve 44, the on-off off valve 47, the cleaning liquid pump 53, the on-off valve 55, the on-off valve 61, the on-off valve 71, the on-off valve 73, the on-off valve 75, the on-off valve 77, etc. The controller may be configured by any combination of hardware and software as long as the desired control is achieved.

Herein, a method of boiling noodles by the noodle boiling apparatus of this embodiment described above will be described. The method of boiling noodles of this embodiment includes a start-up process, a noodle boiling process, a pipe cleaning process, and a tank cleaning process. FIG. 5 to FIG. 9 show the flow paths of water, vapor, etc. in each process, in which solid lines show the flow paths used, dotted lines show the flow paths not used, and dashed lines show the flow paths used as necessary (however, the dashed lines in the heat exchanger 21 are not limited to this).

Figure 5:
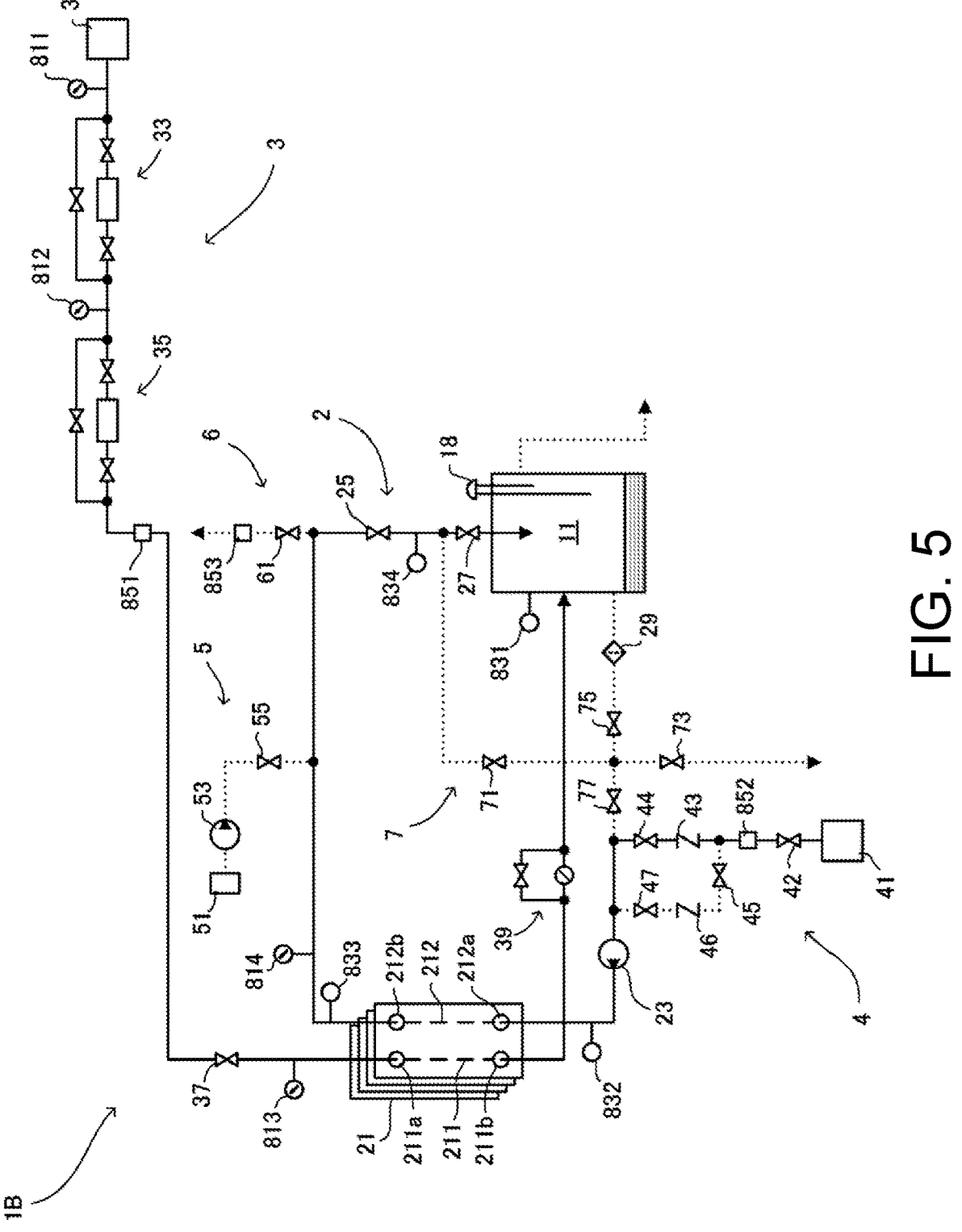
FIG. 5 shows flow paths during a start-up process before starting circulation of hot water.
Figure 6:
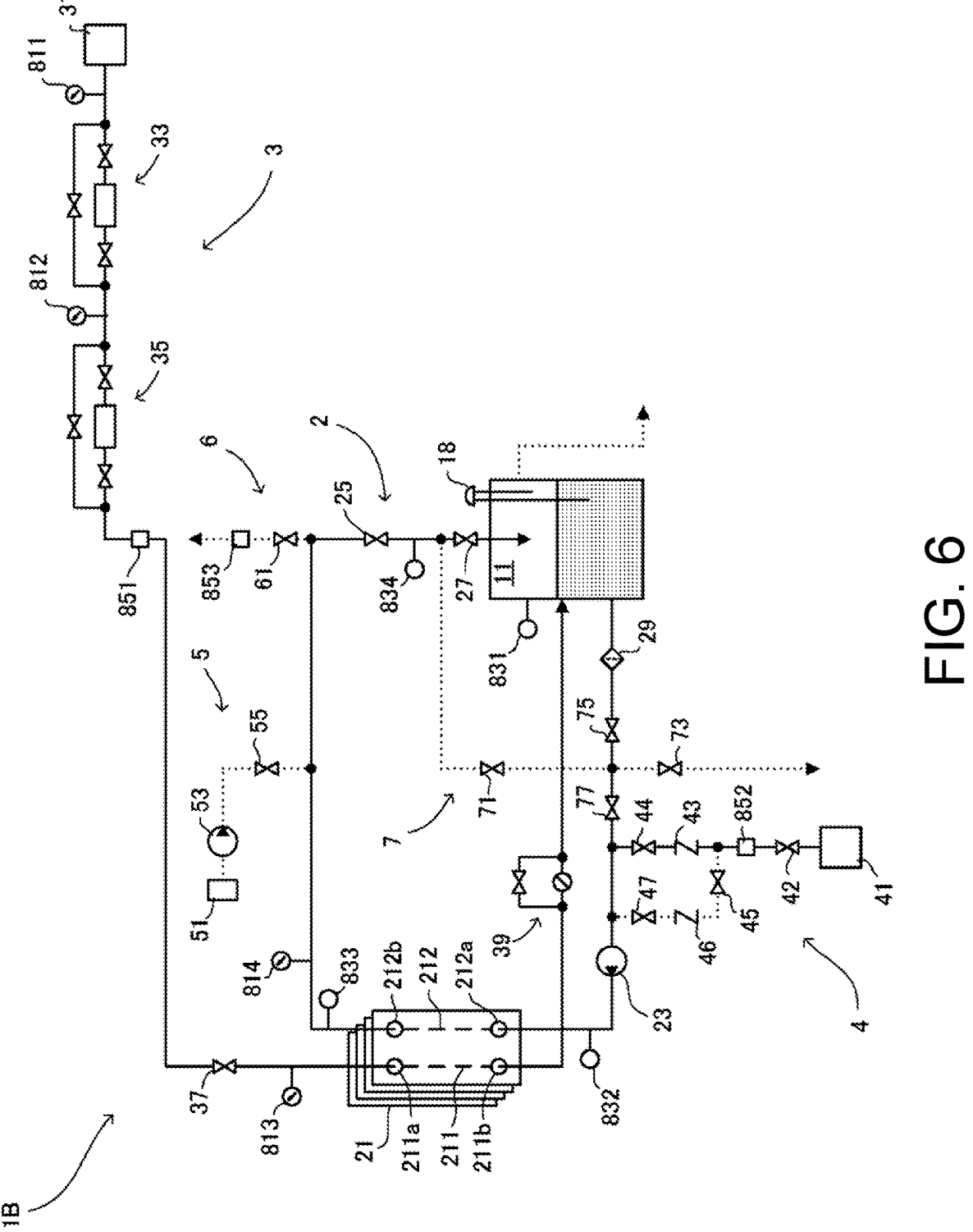
FIG. 6 shows flow paths during the start-up process after starting circulation of hot water.

In the start-up process, hot water of a predetermined temperature is stored in the boiling tank 11. In other words, the water supply to the boiling tank 11 and the heating of water are performed in parallel. First, as shown in FIG. 5, clean water is supplied from the first water supply passage of the water supply passage 4. The supplied clean water is pumped by the circulation pump 23 to the heat exchanger 21, where the water undergoes heat exchange with vapor and is heated to a desired temperature. The hot water thus generated is stored in the boiling tank 11 via the main hot water pipe 131 of the hot water pipe 13. At the time of start-up, the on-off valves 75 and 77 may be closed, and circulation of hot water may be not yet performed. When the water level gauge 18 detects that the hot water of the boiling tank 11 has reached a predetermined water level, the circulation of hot water is started. In other words, as shown in FIG. 6, the on-off valves 75 and 77 are opened, and the discharge pipe 15 and the heat exchanger 21 are communicated with each other. Hot water discharged from the boiling tank 11 and clean water supplied from the first water supply passage of the water supply passage 4 are together pumped by the circulation pump 23 to the heat exchanger 21, are heated, and then are supplied to the boiling tank 11. At this time, the on-off valves 141 and 142 are opened, and hot water is supplied to the boiling tank 11 via the main hot water pipe 131, the loosening jet pipe 132, and the tank bottom jet pipe 133 of the hot water pipe 13. By storing the hot water while circulating the hot water, it is possible to prevent the temperature of the hot water in the boiling tank 11 from dropping during the start-up process.

Figure 7:
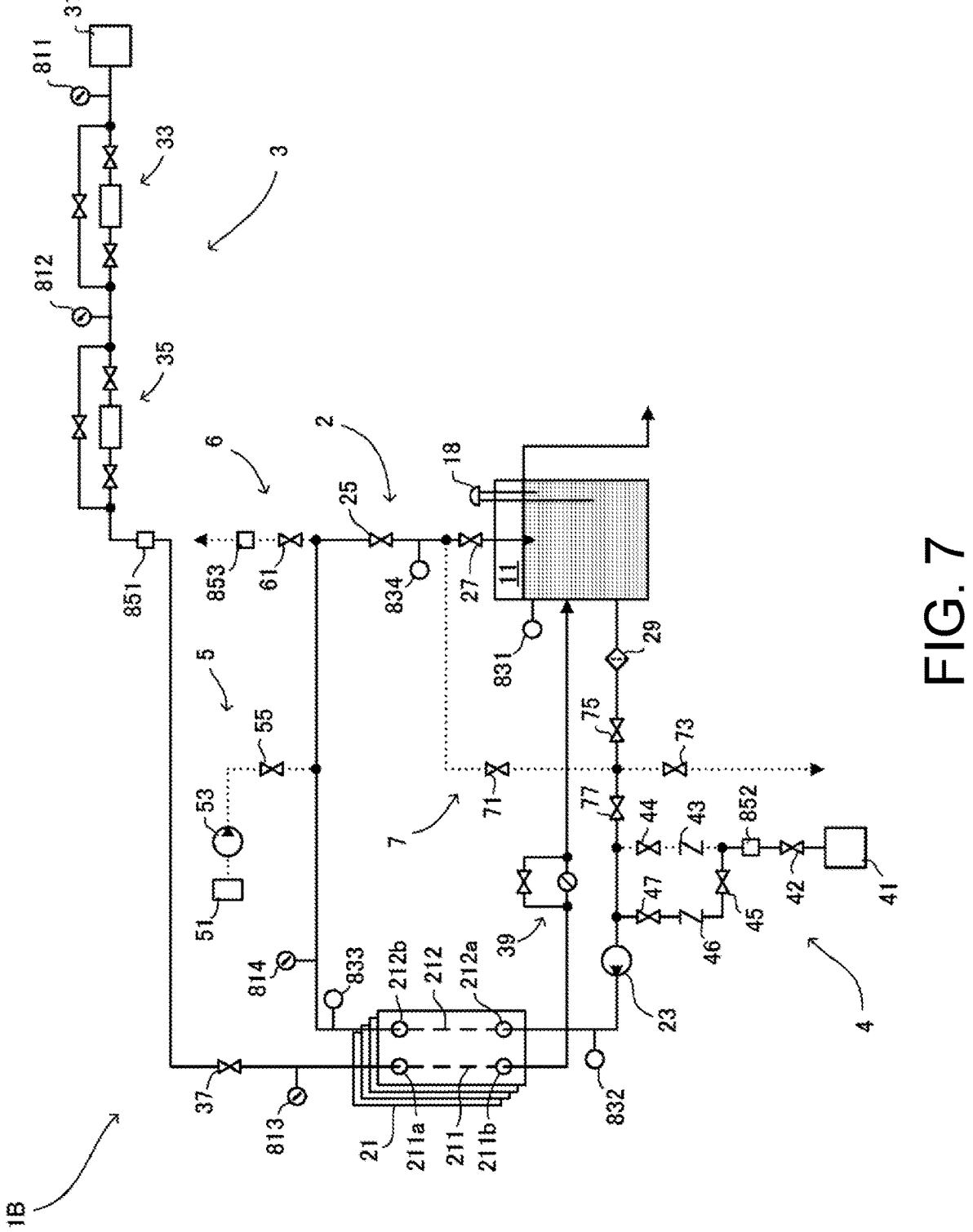
FIG. 7 shows flow paths during a noodle boiling process.

When the water level gauge 18 detects that the boiling tank 11 is full, it is determined that the start-up process has been completed, and the noodle boiling process is performed. As shown in FIG. 7, the supply passage of clean water is switched from the first water supply passage to the second water supply passage, and a smaller amount of clean water than during the start-up process is supplied as added water. Similarly, the hot water discharged from the boiling tank 11 and the clean water supplied from the second water supply passage of the water supply passage 4 are together pumped by the circulation pump 23 to the heat exchanger 21, are heated, and then are supplied to the boiling tank 11. At this time, hot water is supplied to the boiling tank 11 via the main hot water pipe 131, the loosening jet pipe 132, and the tank bottom jet pipe 133 of the hot water pipe 13. With hot water circulated in this manner, noodle boiling is performed in the noodle boiling unit 1A. In other words, in this embodiment, the transfer device 12 is operated, and noodles are continuously transferred and boiled in the boiling tank 11. Accordingly, during the noodle boiling process, water is constantly circulated between the boiling tank 11 and the hot water supply mechanism 1B. Since water flows are constantly generated in the boiling tank 11, precipitate is unlikely to adhere to the boiling tank 11.

In the noodle boiling process, hot water may be circulated at a high speed to maintain the hot water temperature in the boiling tank 11. Specifically, the required amount of circulating water is calculated as follows. The required amount of circulating water per minute is V (L/min), the amount of heat per minute radiated to the outside of the apparatus is Q (kcal/min), the amount of heat per minute taken by the noodles and the added water is W (kcal/min), the inlet temperature of water of the heat exchanger 21 is $T_1$ (° C.), and the outlet temperature of water of the heat exchanger 21 is $T_2$ (° C.). Herein, assuming that the density of the circulating water is 1.0 (g/cm$^3$) and the specific heat of the circulating water is 1.0 (cal/g·° C.), Mathematical Formula 1 below holds according to the formula of heat "heat (cal)=mass (g)×specific heat (cal/g·° C.)×temperature difference (° C.)".

$$1000 \times (Q + W) = \qquad\qquad\qquad\qquad\qquad \text{[Math. 1]}$$
$$(1000 \times V \times 1.0) \times 1.0 \times (T_2 - T_1) \Leftrightarrow V = \frac{Q + W}{T_2 - T_1}$$

In other words, in the noodle boiling apparatus of this embodiment, since a value obtained by dividing the amount of heat (kcal) per minute required for performing noodle boiling by the amount of temperature rise (° C.) due to the heat exchanger 21 is the required amount of circulating water V (L/min), the noodle boiling process may be performed while circulating hot water at this water amount or above.

According to an experiment, it is estimated that, regardless of the size of the boiling tank 11, if hot water is circulated at a water amount equal to or greater than a value obtained by dividing a water amount (L) at the time of full capacity of the boiling tank 11 by 2, the required amount of circulating water V (L/min) or above may be obtained, and the hot water temperature may be maintained.

Figure 8:
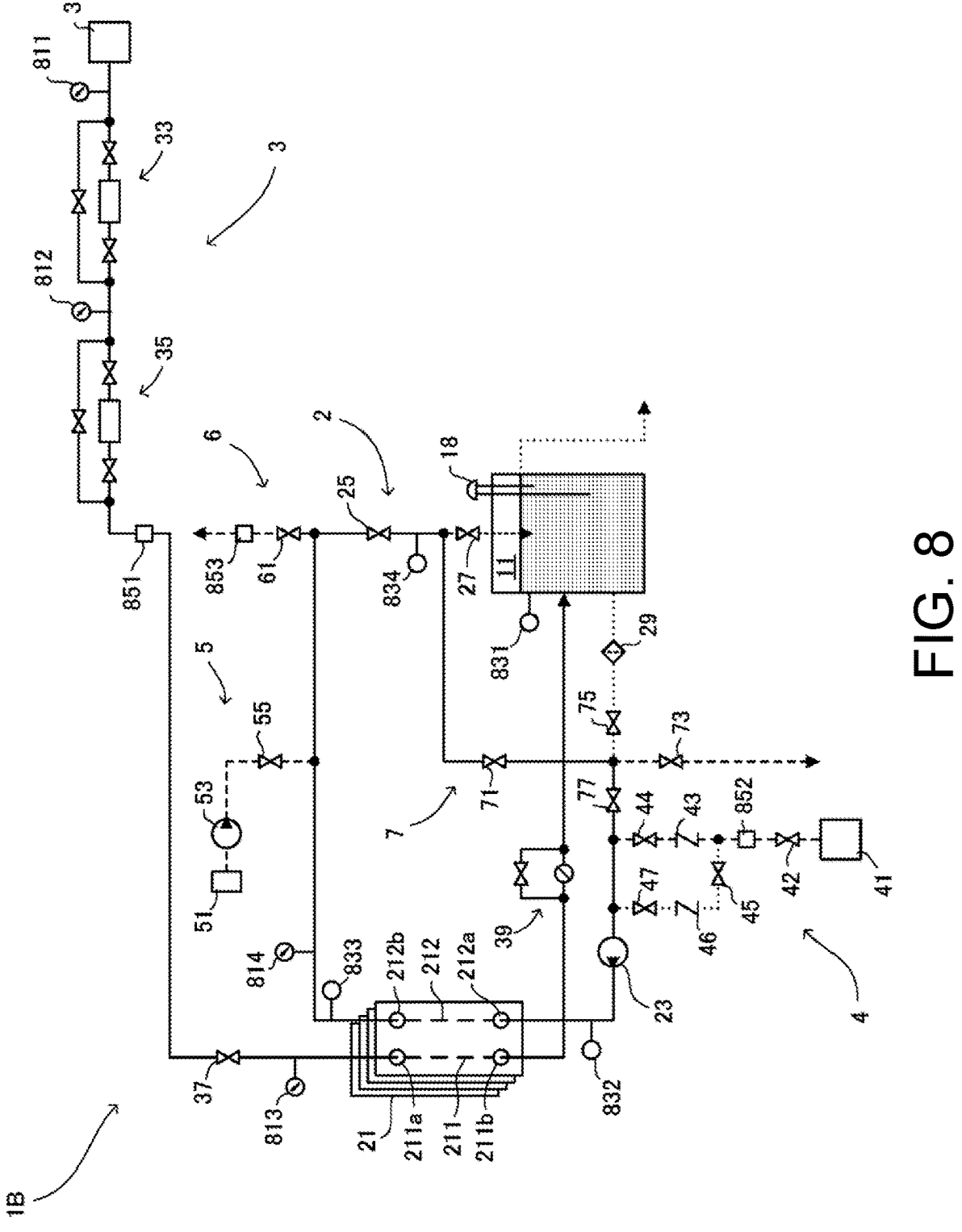
FIG. 8 shows flow paths during a pipe cleaning process.

After the noodle boiling process is completed, the pipe cleaning process is performed. First, with the on-off valves 27, 75, and 77 being closed, the on-off valves 71 and 73 are opened, and the water in the circulation passage 2 is drained. Next, as shown in FIG. 8, with the on-off valves 27, 73, and 75 being closed, the on-off valves 71 and 77 are opened, and a flow path through which water may circulate is formed without going through the boiling tank 11. Then, clean water is supplied from the second water supply passage of the water supply passage 4 to the circulation passage 2. At this time, the on-off valve 61 is opened, and air and water vapor pushed out by water are discharged from the degassing passage 6. When the flow meter 853 detects that the water has reached the degassing passage 6, the on-off valve 61 is closed. Accordingly, it is possible to prevent air or water vapor from flowing into the circulation pump 23. On the other hand, the on-off valve 55 is opened, and the cleaning liquid is appropriately supplied from the cleaning liquid pump unit 5 to the circulation passage 2. When the flow meter 853 detects a predetermined flow rate and determines that the pipe of the circulation passage 2 is filled with water containing the cleaning liquid, the on-off valve 47 is closed, and the water supply from the water supply passage 4 is stopped. In this state, the water containing the cleaning liquid is pumped by the circulation pump 23 and circulates in the pipe. Depending on the type of the cleaning liquid, the circulating water may be heated by the heat exchanger 21 to enhance the cleaning effect. After circulating the water for a predetermined time, the on-off valve 77 is closed, the on-off valve 73 is opened, and the water is discharged to the outside of the apparatus. Then, the above procedure is repeated to perform pipe cleaning.

Figure 9:
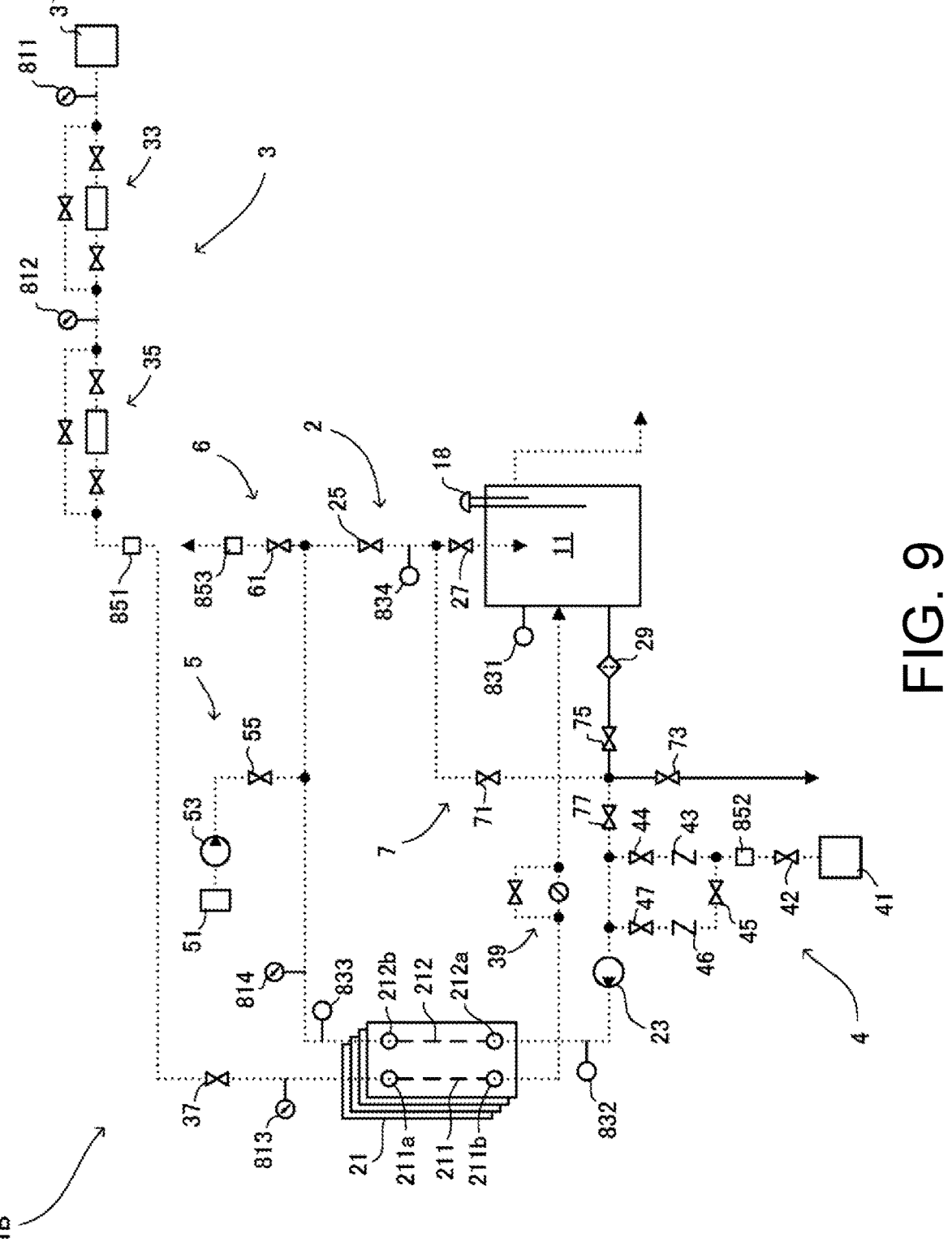
FIG. 9 shows flow paths during a tank cleaning process.

After the pipe cleaning process is completed, the tank cleaning process is performed. First, as shown in FIG. 9, with the on-off valves 71 and 77 being closed, the on-off valves 73 and 75 are opened, and the water stored in the boiling tank 11 is discharged. Afterwards, the boiling tank 11 is cleaned by any method. For example, when the boiling tank 11 is provided with a nozzle (not shown) capable of ejecting pressurized hot water or a cleaning liquid, cleaning-in-place of the boiling tank 11 is performed using the nozzle. Alternatively, the operator may also manually clean the boiling tank 11. The pipe cleaning process and the tank cleaning process may be performed in parallel, or the tank cleaning process may be performed first.

As having been specifically shown in some examples, the disclosure it is not limited to the configuration of the embodiment shown in the drawings, and various modifications or applications are possible without departing from the technical concept of the disclosure.

For example, in this embodiment, the drain generated from the vapor used for heat exchange is supplied to the boiling tank 11 via the drain supply pipe 17, but the drain may also be discharged to the outside of the apparatus.

Further, it is desirable that the pressure of vapor supplied to the heat exchanger 21 is suppressed as low as possible. Therefore, specifically, the pressure of vapor adjusted by at least one of the first pressure reducing valve 33 and the second pressure reducing valve 35 is desirably 0.03 MPa or more and 0.07 MPa or less. Latent heat decreases as pressure increases. By lowering the pressure of vapor, heat exchange can be efficiently performed in the heat exchanger 21, and the amount of vapor used can be reduced.

Further, when the set temperature of hot water is a high temperature close to 100° C., it is desirable that the proportioning valve 37 is controlled by PID control. By setting an appropriate gain value, it is possible to prevent boiling of hot water and prevent temperature variation.

What is claimed is:

1. A noodle boiling apparatus comprising:
    a noodle boiling unit; and
    a hot water supply mechanism supplying water, which is heated, to the noodle boiling unit,
    wherein the noodle boiling unit comprises:
        a boiling tank storing the water and boiling noodles;
        a hot water pipe supplying the water, which is heated, to the boiling tank;
        a transfer device having a plurality of buckets containing the noodles and guided inside the boiling tank, wherein the plurality of buckets transfer the noodles while passing the noodles through the water, which is heated, in the boiling tank; and
        a discharge pipe discharging the water from the boiling tank to the hot water supply mechanism,
    the hot water supply mechanism comprises:
        a heat exchanger comprising a first passage having a first inlet to which vapor is supplied and a first outlet from which the vapor is discharged, and a second passage having a second inlet to which the water is supplied and a second outlet from which the water is discharged, wherein the first inlet is connected to a vapor supplier which supplies the vapor, the second inlet is connected to the discharge pipe and a clean water supplier which supplies clean water, the second outlet is connected to the hot water pipe, and the water flowing in the second passage undergoes heat exchange by the vapor flowing in the first passage to be heated to a desired temperature; and
        a circulation pump provided between the second inlet and the discharge pipe and pumping the water to the second inlet, and
    the hot water supply mechanism is configured to circulate the water constantly between the boiling tank and the hot water supply mechanism when the noodles are boiled,
    wherein the hot water pipe comprises a jet pipe ejecting a jet of the water, which is heated, into the boiling tank,
    wherein the jet pipe comprises a tank bottom jet pipe ejecting the jet of the water, which is heated, to a bottom surface of the boiling tank.

2. The noodle boiling apparatus according to claim 1, wherein the hot water supply mechanism is configured to circulate the water between the boiling tank and the hot water supply mechanism by a water amount (L/min) equal to or greater than a value obtained by dividing an amount of heat (kcal) per minute required for performing noodle boiling by an amount of temperature rise (° C.) due to the heat exchanger when the noodles are boiled.

3. The noodle boiling apparatus according to claim 1, wherein the noodle boiling unit further comprises an overflow port which discharges, to outside of the noodle boiling apparatus, the water exceeding a predetermined water level and overflowing from the boiling tank.

4. The noodle boiling apparatus according to claim 1, wherein the clean water supplied from the clean water supplier is supplied to a pipe connecting the circulation pump and the discharge pipe.

5. The noodle boiling apparatus according to claim 1, wherein the hot water supply mechanism further comprises a steam trap which is connected to the first outlet and discharges a drain generated from the vapor, and the noodle boiling unit further comprises a drain supply pipe which supplies the drain discharged from the steam trap to the boiling tank.

6. The noodle boiling apparatus according to claim 1, wherein the hot water supply mechanism further comprises a cleaning liquid pump unit which supplies a cleaning agent to a circulation passage of the water between the boiling tank and the heat exchanger, and the cleaning liquid pump unit comprises a cleaning liquid tank which stores the cleaning agent and a cleaning liquid pump which pumps the cleaning agent in the cleaning liquid tank.

7. The noodle boiling apparatus according to claim 1, wherein the hot water supply mechanism further comprises a degassing passage configured to be capable of discharging air and water vapor contained in the water from a circulation passage of the water between the boiling tank and the heat exchanger.

\* \* \* \* \*